United States Patent [19]
Requa et al.

[11] 3,962,681
[45] June 8, 1976

[54] PAGE WIDTH OPTICAL CHARACTER PROCESSING METHOD AND SYSTEM

[75] Inventors: Stanley C. Requa, Dallas; Richard Gayle Van Tyne, Richardson, both of Tex.

[73] Assignee: Recognition Equipment Incorporated, Irving, Tex.

[22] Filed: June 19, 1972

[21] Appl. No.: 264,014

[52] U.S. Cl. .............. 340/146.3 H; 340/146.3 AG; 340/146.3 MA; 178/7.6; 179/15 AE
[51] Int. Cl. ........................................... G06k 9/12
[58] Field of Search........ 340/146.3 AG, 146.3 MA, 340/146.3 H; 250/220 M; 178/7.6, 7.2, 6.8, DIG. 39; 179/15 AE

[56] References Cited
UNITED STATES PATENTS

| | | | |
|---|---|---|---|
| 3,159,815 | 12/1964 | Groce | 340/146.3 AG |
| 3,234,327 | 2/1966 | McMann, Jr. | 178/7.2 |
| 3,293,415 | 12/1966 | Fiehl | 235/61.11 E |
| 3,475,555 | 10/1969 | McMann, Jr. | 178/6.8 |
| 3,582,884 | 6/1971 | Shepard | 340/146.3 H |
| 3,651,462 | 3/1972 | Balm | 340/146.3 H |
| 3,697,682 | 10/1972 | Berg | 178/6.8 |
| 3,717,848 | 2/1973 | Irvin et al. | 340/146.3 MA |

OTHER PUBLICATIONS

Salsbury et al., "A Monolithic Image Sensor . . . ," Proceedings of the IEEE, vol. 58, No. 9, Sept. 1970, pp. 1302-1305.
Swart, "Contrast Amplifier," IBM Tech. Disclosure Bulletin, vol. 14, No. 3, Aug. 1971, pp. 883-884.
Crawford, "Pictorial Information Disector and Analyzer System," IBM Tech. Disclosure Bulletin, vol. 15, No. 1, June 1972, pp. 61 & 62.

*Primary Examiner*—Paul J. Henon
*Assistant Examiner*—Leo H. Boudreau
*Attorney, Agent, or Firm*—Richards, Harris & Medlock

[57] ABSTRACT

A transport system moves documents beneath a self-scanned photocell array extending substantially the entire width of a page. The output data from the photocells is scanned via a plurality of channels, amplified, multiplexed, and converted to a digital format. The digital data is then processed to compensate for fixed pattern errors characteristic of the photocell array and for scan pattern error. The corrected digital data is quantized for character thresholding and input to a recirculating memory. Line-tracking circuitry monitors the location of individual lines of character data within the recirculating memory and gates a complete line of character data into one of two storage registers. While data is input to one register, the contents of the other register is output to character recognition circuitry.

19 Claims, 16 Drawing Figures

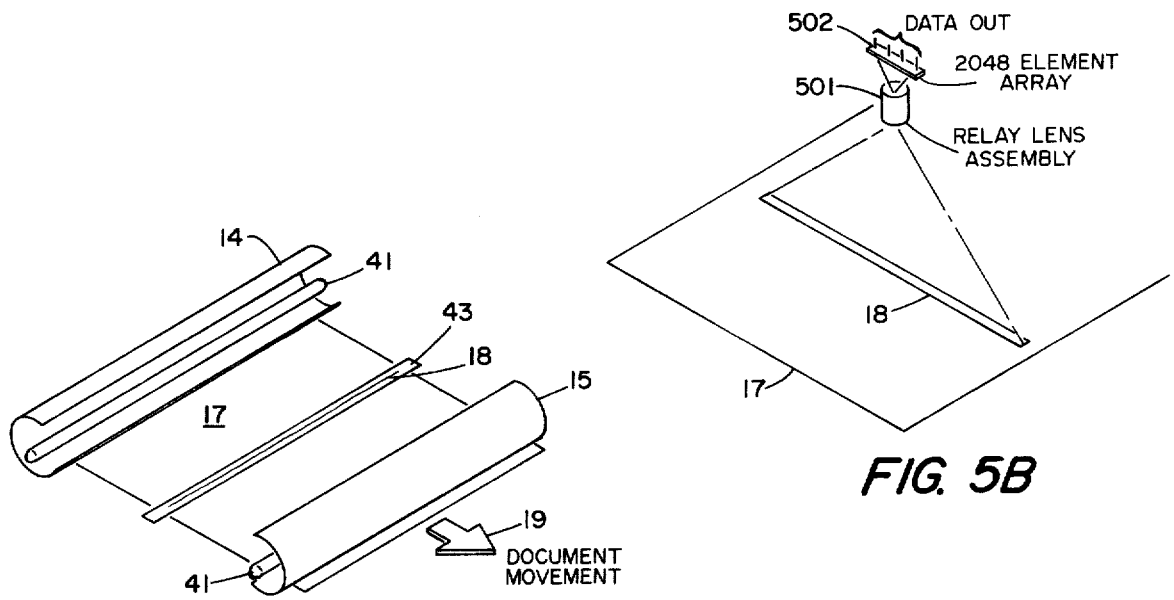
FIG. 3
FIG. 5B
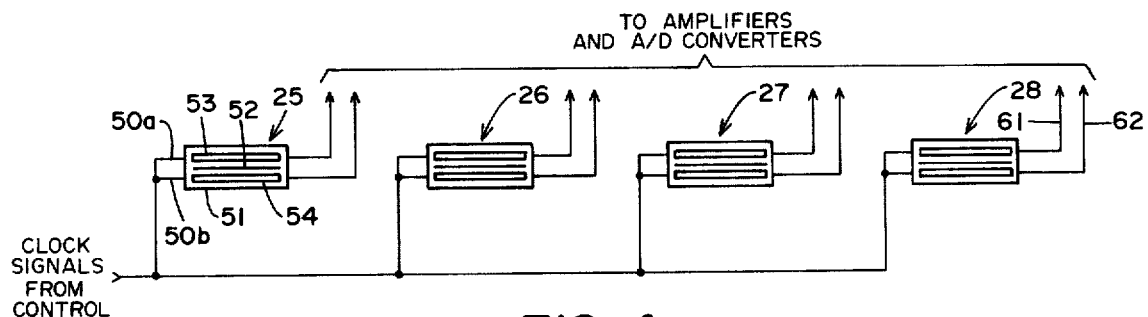
FIG. 4
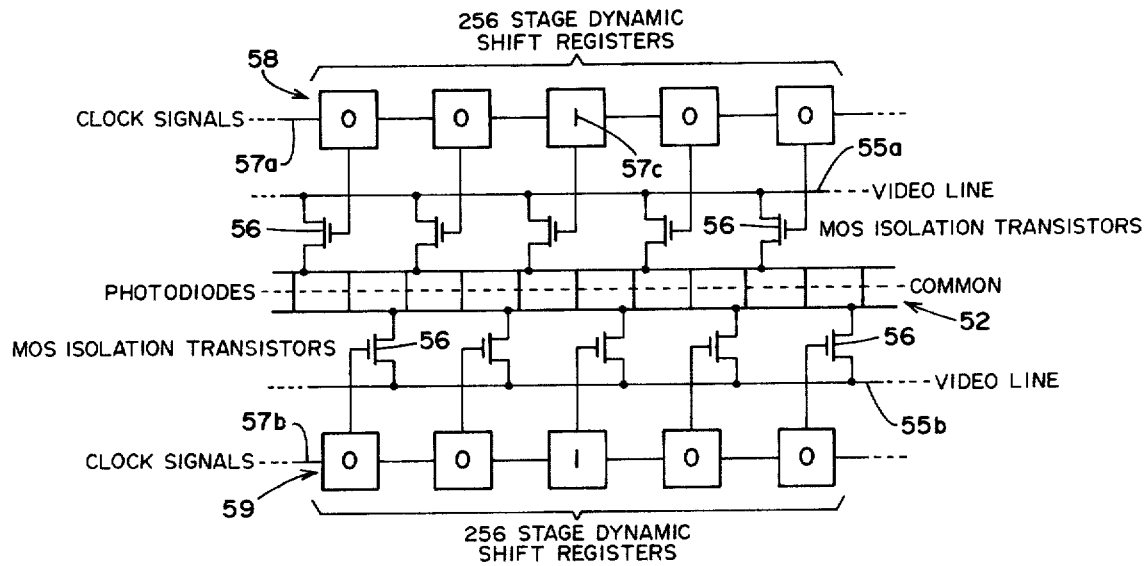
FIG. 5A

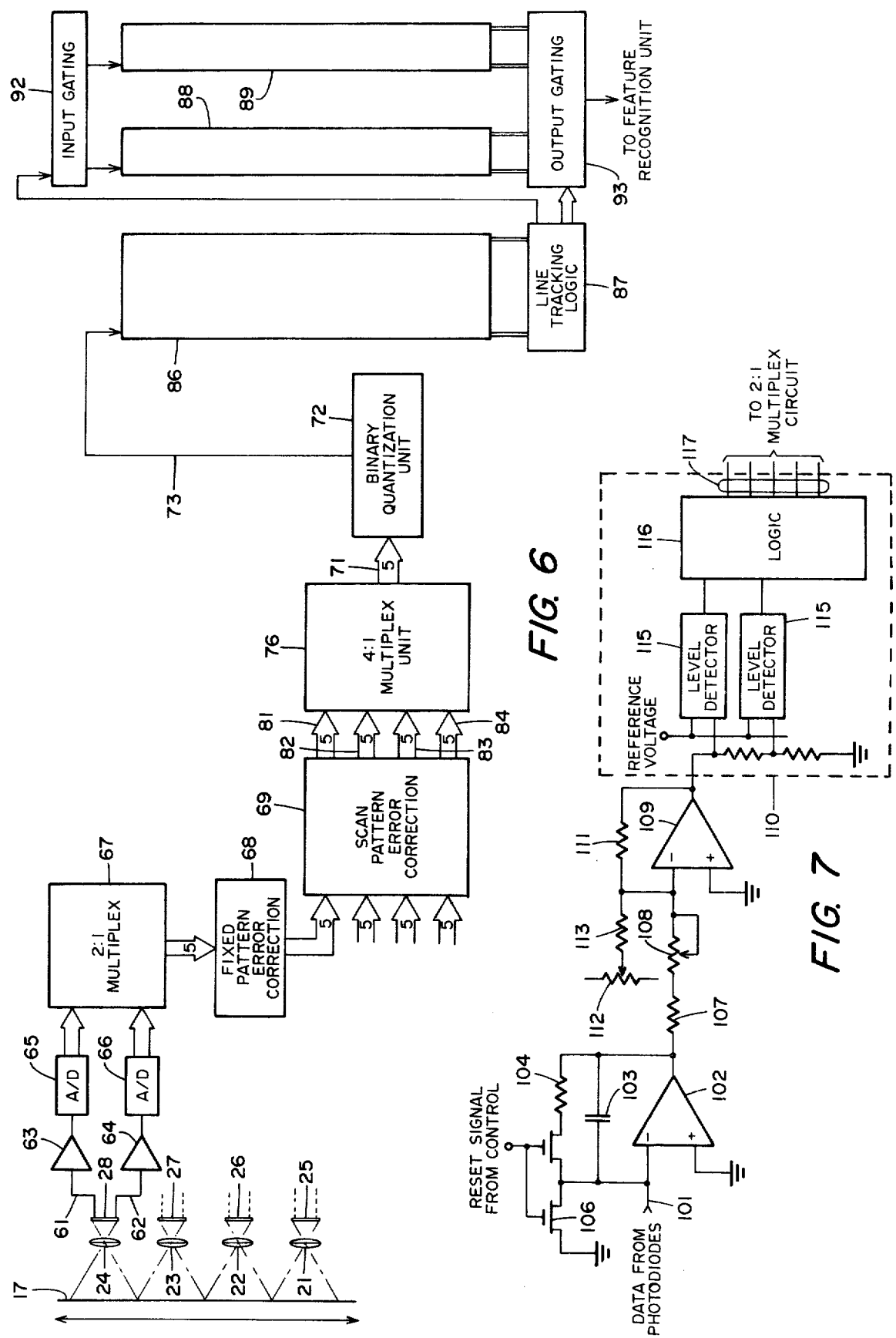

| PHOTODIODE CELL NUMBER n | APPARENT BLACK $R'_b(n)$ | ACTUAL BLACK $R_b(n)$ | DIFFERENCE $R'_b(n)-R_b(n)$ "CODE BLACK" $C_b(n)$ | APPARENT WHITE $R'_w(n)$ | APPARENT WHITE MINUS CODE BLACK $R'_w(n)-C_b(n)$ | WHITE CODE FACTER/2 $C_w(n)/2$ | ACTUAL WHITE $R_w(n)$ |
|---|---|---|---|---|---|---|---|
| 0 | 00010 | 00000 | 00010 | 10111 | 10101 | 10110 | 11101 |
| 1 | 00011 | 00000 | 00011 | 11001 | 10110 | 10101 | 11101 |
| 2 | 00010 | 00000 | 00010 | 11000 | 10110 | 10101 | 11101 |
| 3 | 00011 | 00000 | 00011 | 11001 | 10110 | 10101 | 11101 |
| 4 | 00010 | 00000 | 00010 | 10111 | 10101 | 10110 | 11101 |
| n | 00011 | 00000 | 00011 | 10110 | 10011 | 10111 | 11101 |

FIG. 9

PAGE WIDTH OPTICAL CHARACTER PROCESSING METHOD AND SYSTEM

The invention relates to optical character recognition, and more particularly, to an optical character recognition method and system which includes a page width optical scanner.

The development of page width optical scanning systems has been impeded by the requirements of extremely high data processing rates. These date handling requirements have demanded that only small portions of data from a character array be gathered and processed at one time. The present system overcomes these disadvantages by providing multiplexing arrangements whereby a plurality of channels are sampled simultaneously at a considerably slower data rate than would be necessary if serial scanning and processing were employed.

Page width scanners incorporate a large number of photodiodes in a linear array. The respective outputs from many photodiodes of the same type includes some inherent fixed pattern error resulting from sources such as material differences in the photodiodes, illumination differences, and lens vignetting. The present system employs circuitry which establishes what these fixed pattern values are for each photodiode in the array and then applies a correction factor to the data output from each cell in order to correct these errors.

The present invention is directed to a method and system in which a page width photodiode array has projected thereon a portion of a line of characters to be read and provides a self-scanned output signal from each of the photodiodes. The output data are amplified, converted to a digital format and corrected by application of pre-established correction factors to yield a corrected data format. The data are then corrected for scan pattern offset and output through a buffer memory to recognition circuitry.

More particularly, in accordance with the invention, a page width optical scanning system includes means for transporting a document, having lines of characters thereon to be read, in a direction perpendicular to the lines. Photosensitive means repeatedly scans the entire length of a line of characters and produces analog output data signals indicative of light or dark character areas which are then integrated and amplified. The analog character cell data signals are converted to a train of digital character cell data words and corrected for fixed pattern errors on a cell-by-cell basis. The corrected character cell data is corrected for scan pattern offset and binary quantized. Character cell data from successive line scans is received by a buffer memory and at least one entire line of characters is stored for subsequent processing by character recognition circuitry.

For a more complete understanding of the present invention and for further objects and advantages thereof, reference may now be had to the following description taken in conjunction with the accompanying drawing in which:

FIG. 3 is a perspective illustration of the document illumination system used in conjunction with the invention;

FIG. 4 is an illustrative schematic diagram of the self-scanned photocell arrays used in conjunction with the invention;

FIG. 5A is a block diagram of a portion of one of the self-scanned photocell arrays used in the invention;

FIG. 5B is a perspective illustration of an alternate embodiment of a self-scanned photocell array used in the invention;

FIG. 6 is a block diagram of the character scanning system of the invention;

FIG. 7 is a schematic diagram of one of the integrating amplifiers and analog/digital converters used in the invention;

FIGS. 9 and 10a–10c are charts which serve to explain the operation of the circuitry of FIG. 8;

DETAILED DESCRIPTION

Figure 1:
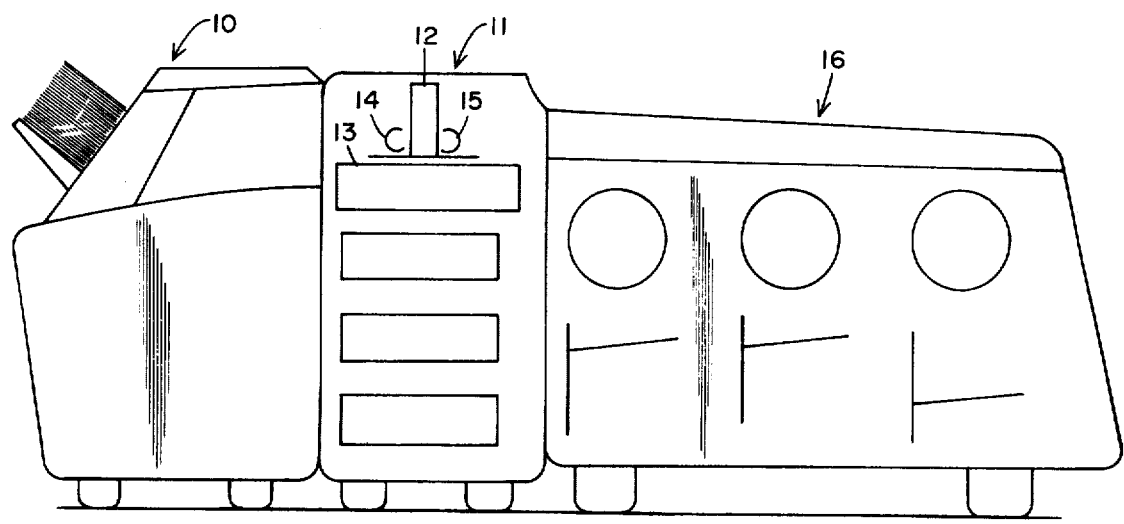
FIG. 1 is a page processor constructed in accordance with the invention.

Referring now to FIG. 1, a page processing system is shown which includes a document feeding module 10 which delivers one sheet at a time to a page processor 11. The page processor 11 includes a page width photosensitive scanner 12 and a flat bed paper transport 13 which is adapted to move documents to be read from the feeding module 10 beneath the photosensitive scanner 12. A pair of lamp reflectors 14 and 15, shown in detail in FIG. 3, are mounted on opposite sides of the scanner 12 to illuminate the line of characters being read. After scanning, the documents are passed to a sorting and stacking module 16 which arranges the documents which have been read in preselected groups.

Figure 2:
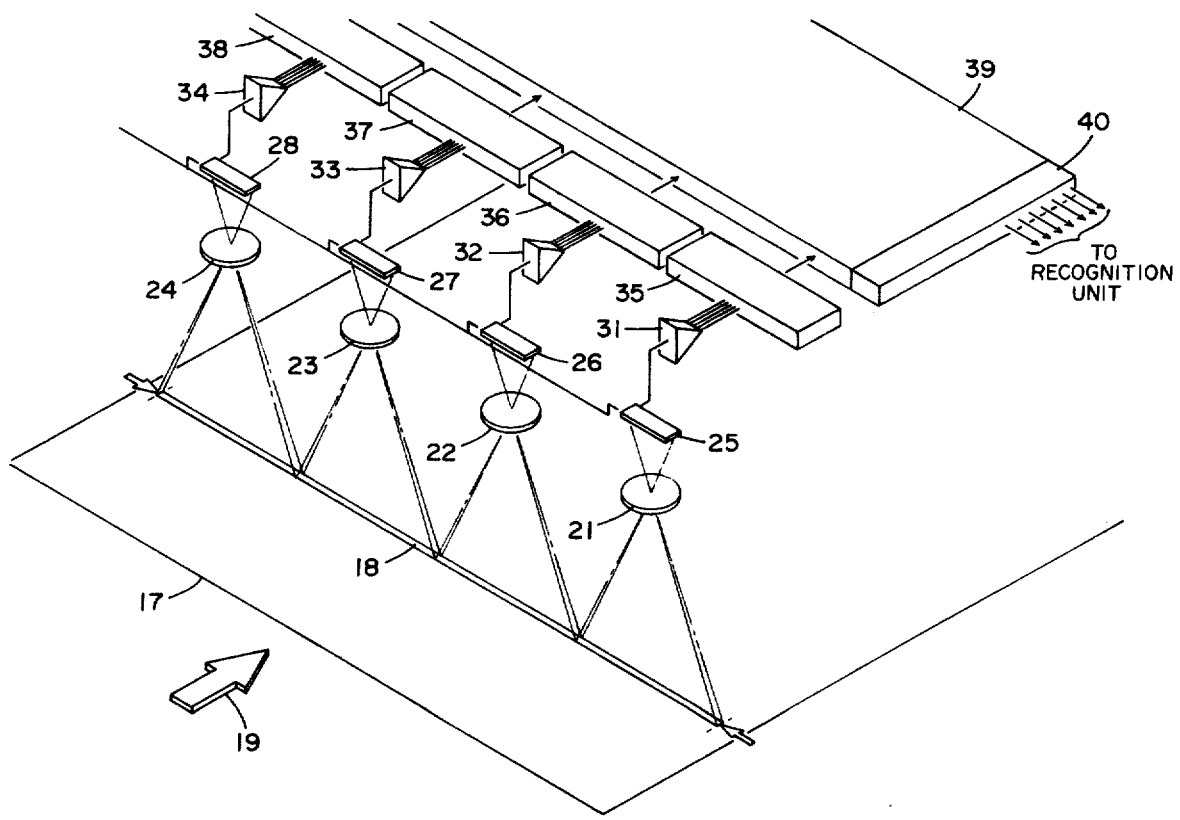
FIG. 2 is a perspective illustration of the page width character scanning system of the invention.

Referring to FIG. 2, a document 17 having transversely extending lines of characters 18 is moved beneath the photocell scanner 12. The document 17 is transported in the direction of arrow 19 which is generally perpendicular to the lines of characters 18 being scanned.

An image of a line of characters 18 extending across substantially the entire useful width of the document 17, is projected by means of a plurality of lenses 21–24 onto the photosensitive scanner 12 which may comprise four self-scanned photodiode arrays 25–28. Each of the lenses 21–24 view adjacent illuminated regions so that a complete line of characters 18 is projected onto the photodiode arrays 25–28. Each of the four arrays 25–28 may typically comprise 512 photodiodes to obtain a field of view of 2,048 resolution elements across a typical ten-inch page width. As will be further explained below, each of the arrays 25–28 include circuitry which, on command, scans the incident light level on each of the photodiodes and produces a train of output signals. The scanned outputs of each of the arrays 25–28 are passed through amplifiers and analog-to-digital converters 31–34 into pre-processing circuits 35–38. As will also be explained in further detail below, the pre-processing circuitry corrects fixed pattern errors in the photodiode outputs which are inherent in the scanning sensor and, in addition, corrects scan pattern offset in the data from the arrays and binary quantizes each output into either a black or a white decision. The pre-processed digital data is then stored in a line-by-line data memory 39 which has the capacity for storing approximately two complete lines of character images. A linetracking circuit 40 follows the data through the memory 39 so that a complete line of data may be located within the memory. The data is shifted out of the memory 39 to a recognition unit for character identification.

Referring now to FIG. 3, it can be seen how each individual line of data is illuminated and scanned by the page width photodiode array used in the invention. A pair of elongate incandescent lamps 41 are mounted coaxially with semi-cylindrical reflectors 14 and 15 which project light from the lamps 41 into a narrow strip to form an elongate illuminated region 43 on the surface of the document 17. The illuminated region 43 is in alignment with the field of view of the sensor and extends parallel to the character lines 18 and perpendicular to the direction of document movement, shown by arrow 19.

FIG. 4 shows the four self-scanned photodiode arrays 25–28 which comprise the scanner used in the invention. Each of the arrays comprises a single substrate 51 having a linear column of photodiodes 52 extending along the central portion. Arranged on opposite sides of the column 52 are two multi-stage scanning shift registers 53 and 54 and an isolation transistor associated with each photodiode in the column 52. In one embodiment of the invention, an array such as the model RL-512 linear self-scanning array manufactured by the Reticon Corporation of Mountain View, California was used. Each of the interdigitated arrays comprise a photodiode column 52 of 512 photodiode elements which are one mil by one mil and are arranged in the column on one mil centers. The output signals from the diodes in the columns 52 are scanned by impressing clock pulses upon two input leads 50a and 50b. The output photocell data is transmitted over eight parallel channels, two channels for each array, to amplifiers and analog-to-digital converters.

A portion of the internal structure of each of the photodiode arrays is shown schematically in FIG. 5A. Each one of the photodiodes in the columnar array 52 is connected to a video line 55a or 55b through an MOS field effect isolation transistor 56. The odd-numbered group of photodiodes are connected to one video line while the even-numbered group of photodiodes are connected to the other.

When a series of pulses is applied to two clock lines 57a and 57b, an enable bit is stepped along each of two 256-stage dynamic shift registers 58 and 59 to sequentially energize adjacent ones of the isolation transistors 56. The odd-numbered group of photodiode elements are accessed through one shift register and the even-numbered group of elements are accessed through the other shift register. For example, if pulses are applied to clock line 57a, an enable bit 57c is moved along shift register 58 and output photodiode data is produced on video line 55a. An array may be scanned by alternately pulsing the clock lines 57a and 57b so that the video lines 55a and 55b may be tied together to produce one common train of signals. For higher speed operation, preferred in the present embodiment, the clock lines 57a and 57b may be pulsed simultaneously and one group of data collected from each of the separate video lines 55a and 55b. The photodiodes in each array operate in a charge storage mode, i.e., the array is scanned with each diode being sequentially accessed and charged through a common video line to a standard voltage value. During the scan period, the diodes are discharged by the photo current generated by incident light. The charge required to restore each diode in sequence to the standard voltage is the video output signal. As illustrated in FIG. 5A, the diodes are accessed by dynamic shift registers integrated onto the same silicon chip. As each diode is sampled, it is charged through the video line. Thus, in the preferred configuration, the output on each scan is two trains of 256 pulses, each with an amplitude proportional to the spatial variation in light intensity across the array.

In the preferred embodiment of the invention, four separate 512 element arrays are used to produce a composite field of view of 2,048 elements. Alternatively, a 2,048 element columnar array formed on a single LSI chip could be employed in the system of the invention. As shown in FIG. 5B, a document 17 having transversely extending lines of characters 18 is moved beneath a single relay lens assembly 501 which is arranged to project a single image of an entire page width line 18 onto a single photodiode array 502. The array 502 is similar to the diode arrays 25–28 of FIG. 4 except that a column of 2,048 elements is arranged on a single LSI chip together with 2,048 FET isolation transistors (1,024 on each side of the photodiode array), and 2,048 charge coupled device (CCD) shift registers (1,024 elements arranged on each side of the photodiode array.)

The use of a single LSI chip array solves a number of problems associated with four separate arrays. For example, the arrays on the four chips must be very precisely, axially aligned and must be precisely spaced from one another to insure that each one of the four contiguous lines of print images is intercepted by the four separate arrays. The use of a single LSI chip array also presents certain additional problems such as an increase in the likelihood of a fixed pattern defect in one or more of the diodes and a high probability of lens vignetting due to a relatively short object-image distance. The errors can be corrected, however, by the fixed pattern error correction circuitry used in the invention.

FIG. 6 is a block diagram of the page width optical character processing system of the present invention. The four lenses 21–24 are arranged to intercept adjacent regions of an entire line of characters on the surface of the document 17. An image of the character line is projected through the lenses 21–24 onto the surface of the four self-scanned photocell arrays 25–28. Referring to the circuitry associated with array 28 by way of example, two output channels 61 and 62 are coupled, respectively, to the input terminals of two integrating amplifiers 63 and 64. The odd-numbered photodiode elements are sampled and output on line 61 simultaneously with the even-numbered photodiode elements which are sampled and output on line 62. Thus, signals may be processed at a very high scan rate since each of the two video amplifiers 63 and 64 are only required to operate at half the actual rate of scanning the diodes in the array 28.

The outputs of the integrating amplifiers 63 and 64 are connected, respectively, to the inputs of two analog-to-digital converters 65 and 66. Each of the analog-to-digital converters 65 and 66 produces a serial stream of five-bit data words which are digital equivalents of the photodiode output signals. The data word output rate from the analog-to-digital converters is the same as the scanning frequency. Preferably, the digital word 11111 is assigned as being the output condition of the analog-to-digital converters when a photodiode views a completely white area and 00000 is the output when a completely black area is viewed.

The outputs of the analog-to-digital converters 65 and 66 are input to a 2:1 multiplex unit 67 which arranges the two streams of five-bit words into a single serial stream of five-bit words. The words output from the two converters are arranged alternately so that the single serial stream output is in the same order as if the diode array 28 had been scanned to produce a single channel output rather than the two channels 61 and 62. The output of the multiplex unit 67 is connected to the input of an error correction circuit 68 wherein each one of the 5-bit words in the serial data stream is corrected to eliminate fixed pattern errors.

The serial data stream of 5-bit words from the error correction circuitry 68 is indicative of the corrected photocell gray level values and is input to a scan pattern error correction circuit 69. After scan pattern correction, the data are input to a 4:1 multiplex unit 76 over channels 81, 82, 83 and 84. The multiplexed single stream of 5-bit data words is passed from the multiplex unit 76 via channel 71 into a binary quantization unit 72 wherein a black or white decision is made for each cell value. The output data from the binary quantization unit 72 comprises a serial stream of single-bit data words indicating either a black condition or a white condition for each photodiode in the array 28.

Data from photocell arrays 25, 26 and 27 are processed in a manner identical to that explained above in connection with photocell array 28. The output data trains are input over channel 81, 82, 83 and 84 into the multiplex unit 76, wherein the four channels are combined into a single channel 71 in the same sequence as the photocell arrays 25–28. The output of the multiplex unit 76 is transmitted over channel 71 to the binary quantization circuit 72 and then via channel 73 to a video buffer memory unit 86. The video buffer memory 86 stores successive page width scans sufficient to encompass a page width line of characters even though the line might be slightly skewed on the page. The data within the memory 86 is examined by a line tracking logic unit 87 which gates lines of characters alternately into either of two line buffer registers 88 and 89. When the buffer memory 86 contains a complete line of character data, data from the buffer memory 86 is transmitted over channel 91 through input gating circuitry 92 so that complete lines of characters are input. The registers 88 and 89 are alternately loaded and unloaded so that data is written into register 88 while data is simultaneously output from register 89. This enables the system to operate continuously at the scanning frequency. Once the character line information is assembled in one of the two registers 88 or 89, it is output through a gating circuit 93 to a feature recognition unit for analysis and character decisions based upon each of the data points comprising the line of characters. The feature recognition unit may be of several different types well known in the art.

INTEGRATING AMPLIFIER AND A/D CONVERTER

In considering the detail operation of the system shown in FIG. 6, the integrating amplifier 63 and the analog-to-digital converters 65 are shown schematically in FIG. 7. Data from a self-scanned photocell array is input over a single channel 101 to a high gain operational amplifier 102. An integrating capacitor 103 is connected in a feedback configuration from the output of the operational amplifier 102 to the input lead 101. A pair of MOS field effect transistors 105 are connected across the capacitor 103, through a resistor 104, to reset the circuit for each pulse to be processed. Dual transistors are employed for increased reset stability. Thus, the transistors 105 are provided with a train of reset signals over line 106.

The output of the integrating amplifier 102 is coupled through a resistor 107 to the input of a level and offset control amplifier circuit including a variable input resistor 108 and a high gain operational amplifier 109. A feedback resistor 111 is connected between the output and the input of the operational amplifier 109. A variable resistor 112 is connected across a voltage source and through a resistor 113 to the feedback resistor 111 in order to provide a level offset control. The output of the operational amplifier 109 is connected to the analog-to-digital converter 110. The A/D converter 110 is of well-known construction and may include a chain of dropping resistors 114 connected, respectively, to level detectors 115, each of which is connected to a reference voltage. Each of the level detectors 115 is connected to logic circuitry 116. The analog-to-digital converter 110 receives a series of pulses of varying amplitude and generates a five-bit digital word for each pulse. In the preferred embodiment, the A/D converter 110 can generate any one of 32 five-bit words indicative of the grey level of an input pulse and deliver a train of words at the scanning frequency over path 117 as its output signal.

In operation, pulses of analog video data comprising current waveforms are input to the circuitry of FIG. 7 over line 101 and a five-bit digital representation of the pulses is obtained over line 117. By virtue of integration, the photocurrent-time average is obtained for the sampled regions of each of the characters. The output signal over line 117 is representative of one of 32 possible "gray levels" extending from black = 00000 to white = 11111.

FIXED PATTERN ERROR CORRECTION

Figure 8:
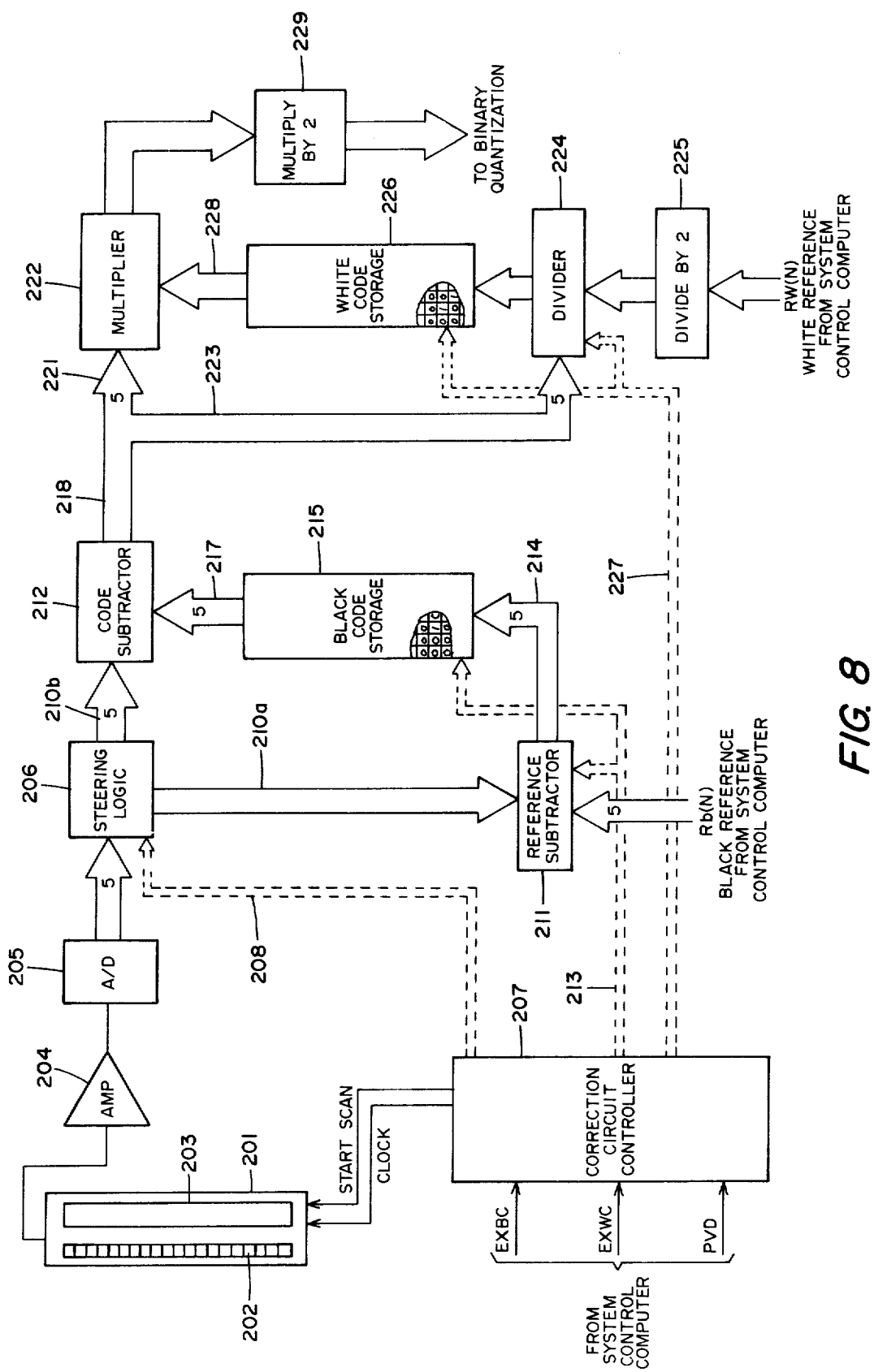
FIG. 8 is a block diagram of the fixed pattern error correction circuitry used in the system of the invention.

After the video data is digitized and multiplexed with data from each of the arrays, it is input to the error correction circuit of FIG. 8. FIG. 8 is a block diagram illustrating the arrangement and function of the error correction circuits employed in the invention to eliminate fixed pattern errors in the photocell outputs. In the discussion of FIG. 8 and subsequent figures, the following terms and their definitions are used:

| | |
|---|---|
| n | photodiode cell number |
| $R'_b(n)$ | apparent black value |
| $R_b(n)$ | actual black value |
| $C_b(n)$ | "code black" value which is equal to $R'_b(n) - R_b(n)$ |
| $R'_w(n)$ | apparent white value |
| $R_w(n)$ | actual white value |
| $C_w(n)$ | "white code" value |

FIG. 8 shows a typical photodiode array 201 including a column of n photodiodes 202 and the associated gating and shift counter circuitry 203. The illumination values of the n photocells are sampled and sequentially passed through an integrating amplifier 204, an analog-to-digital converter 205, and into a steering logic unit 206. The steering logic unit 206, acting in response to signals over path 208 from a controller 207, directs data from the analog-to-digital converter 205 to either a reference subtractor unit 211, via path 210a, or to a code subtractor unit 212, via path 210b. When the circuit is initially calibrated upon startup, black reference signals $R_b(n)$ from a system control computer, are input to the reference subtractor 211 in response to signals over path 213 from the controller 207. The difference signals produced by the subtractor 211 are "black codes" $C_b(n)$ and are delivered over path 214 to a black code storage register 215. Each black code signal $C_b(n)$ is input to an individual storage stage of the storage registers 215 in response to signals from the controller 207 over path 216. The register 215 comprises a recirculating shift register of a capacity sufficient to store at least $n$ five-bit codes, one code for each of the $n$ individual photodiodes in the array 201.

Black codes stored in the register 215 are passed over channel 217 as an input to the code subtractor unit 212. The difference signal $R'_r(n) - C_b(n)$ passes over channel 218 and via path 221 to a multiplier unit 222 and via path 223 to a divider unit 224. When the circuit is initially calibrated, white reference signals $R_w(n)$ are passed from the system control computer into a divide-by-two unit 225 into the divider 224. The quotient produced by divider 224 is stored in a white code storage register 226, identical to the black code storage register 215. Information is gated into both the divider 224 and the white code storage register 226 in response to signals over chanel 227 from th controller 207. The white codes stored in register 226 are passed, via path 228, to the multiplier unit 222. The output of the multiplier 222 is in turn connected to a multiply-by-two circuit 229, the output of which is corrected video $R_r(n)$ which is delivered to the binary quantization circuit 69 of FIG. 6 for further processing.

The function of the circuitry of FIG. 8 is to process a serial stream of five-bit video data from an analog-to-digital converter and provide a corrected video signal $R_r(n)$ output which has been corrected cell-by-cell for fixed pattern errors, such as clock noise in the system, non-uniform document illumination, individual light response differences in photocells, lens vignetting, etc. In the black code storage register 215 there are stored n words (equal to the number of photodiodes per channel) of five bits each. Each black code word enables compensation of its associate photocell output for fixed pattern errors which are independent of illumination, for example, that due to clock noise. The white code storage register 226 contains n words (also equal to the number of photodiodes per channel) to enable compensation of fixed pattern errors on a photodiode-by-photodiode basis which are illumination-related effects, such as photodiode sensitivity due to material differences. In the preferred embodiment, both of the registers 215 and 226 preferably comprise recirculating dynamic shift registers.

Each time the optical character scanning system of the invention is "started up" after a period of inoperation, the error correction circuitry should be calibrated. First, a uniformly "black" document is passed through the sensor field of view and an execute black code signal EXBC is applied to the controller 207. The steering logic path 210a is activated and a black reference value (for example $R_b(n) = 00000$ for all $n$) is subtracted from the apparatus black reflectance $R'_b(n)$ for each value of $n$ (0, 1, 2, 3....$n$). This difference value for each cell is stored in the respective stages of the black code storage register 215.

Next a uniformly "white" document is passed through the sensor field of view and an execute white code command signal EXWC is applied to the controller 207. The steering logic path 210b is selected and an apparent white reflectance signal $R'_w(n)$ is fed to the subtractor 212 to produce an output difference signal $R'_w(n) - C_b(n)$ which is delivered to the divider unit 224. The white reference value $R_w(n)$ from the system control computer is divided by 2 in divider 225 for circuit design reasons and also input to the divider unit 224. The quotient from divider 224 is a white code signal $C_w(n)$ formed by the operation:

$$C_w(n) = \frac{R_w(n)}{2[R'_w(n) - C_b(n)]}$$

The white code signal for each of the $n$ photocells is stored in the respective stages of the white code storage register 226.

Once the system has been calibrated so that black codes and white codes for each of the n photodiodes are stored, respectively, in the registers 215 and 226, the circuit is ready for receiving measured video signals produced by scanning documents.

Once the video correction circuitry of FIG. 8 has been calibrated and both the black code storage register 215 and the white storage register 226 are loaded, a process video data signal PVD is delivered from the system control computer to the controller 207. Data from a document having characters thereon to be analyzed is gathered by scanning the photocells in the array 202, passing the data to the integrating amplifier 204, the analog-to-digital converter 205 and to the steering logic circuitry 206. The uncorrected video data $R'_r(n)$ is input on a cell-by-cell basis to the code subtractor unit 212. The data from the corresponding stages of the black code storage register 215 is also input in synchronism to the code subtractor unit 212 via channel 217 under control of the controller 207. That is, there is a black code stored in register 215 for each individual photocell being scanned; therefore, a black code for a particular photocell must be input to the subtractor 212 at the same time the data from the corresponding photocell is input over path 210b. The subtraction is made in subtractor 212 to produce the difference signal $R_r(n) - C_b(n)$ which is passed via channels 218 and 221 to the multiplier unit 222. The controller 207 also keeps the data supplied from the white code storage register 226 to the multiplier 222 in synchronism with the data flowing into the multiplier 222 from the code subtractor 212. That is, the proper white code is supplied over path 228 to the multiplier 222 for the data corresponding to the same photocell $n$. The product $$\frac{[R'_r(n) - C_b(n)] R_w(n)}{2[R'_w(n) - C_b(n)]}$$

is output to the multiplier 229 wherein the signal is multiplied by 2. The output corrected video data $R_r(n)$, which is equal to $$\frac{[R'_r(n) - C_b(n)] R_w(n)}{R'_w(n) - C_b(n)},$$

and is an output to the binary quantization circuitry.

As can be seen from the description of operation, the theory behind correction for fixed pattern errors is that first the non-illumination-related errors are first removed from the data by subtracting the black code. Next, the illumination-related error, which is proportional to the white reference divided by the white data minus the black, is removed by multiplying the uncorrected data by the proportion factor.

FIG. 9 is a table of exemplary sets of data values which might be calculated for each photocell and used by the circuitry of FIG. 8. Considering the data values for the photocell $n=1$ as an illustration, the apparent black signal, $R'_b(1)$, obtained when a black standard documen is passed beneath the scanner, is 00011. The black reference value, $R_b(1)$, is selected to be 00000 for each photocell. The code black signal, $C_b(n)$, for photocell $n=1$ is obtained by performing the subtraction $R'_b(1) - R_b(1)$ and is equal to 00011. This is the amount by which the output data from photocell $n=1$ must be reduced on each scan in order to eliminate non-illumination related error and correct the output signal to an actual black condition. The apparent white value $R'_w(1)$ is equal to 11001 which is the value output by photocell n=1 when viewing a standard white reference document. The value $R'_w(1) - C_b(1)$ is calculated as 10110. The white code factor $C_w(n)$, which is divided first by two for logic design purposes, is 10101. The actual corrected white value $R_w(1)$, calculated by the circuitry of FIG. 8, is therefore equal to 11101.

Figure 10:
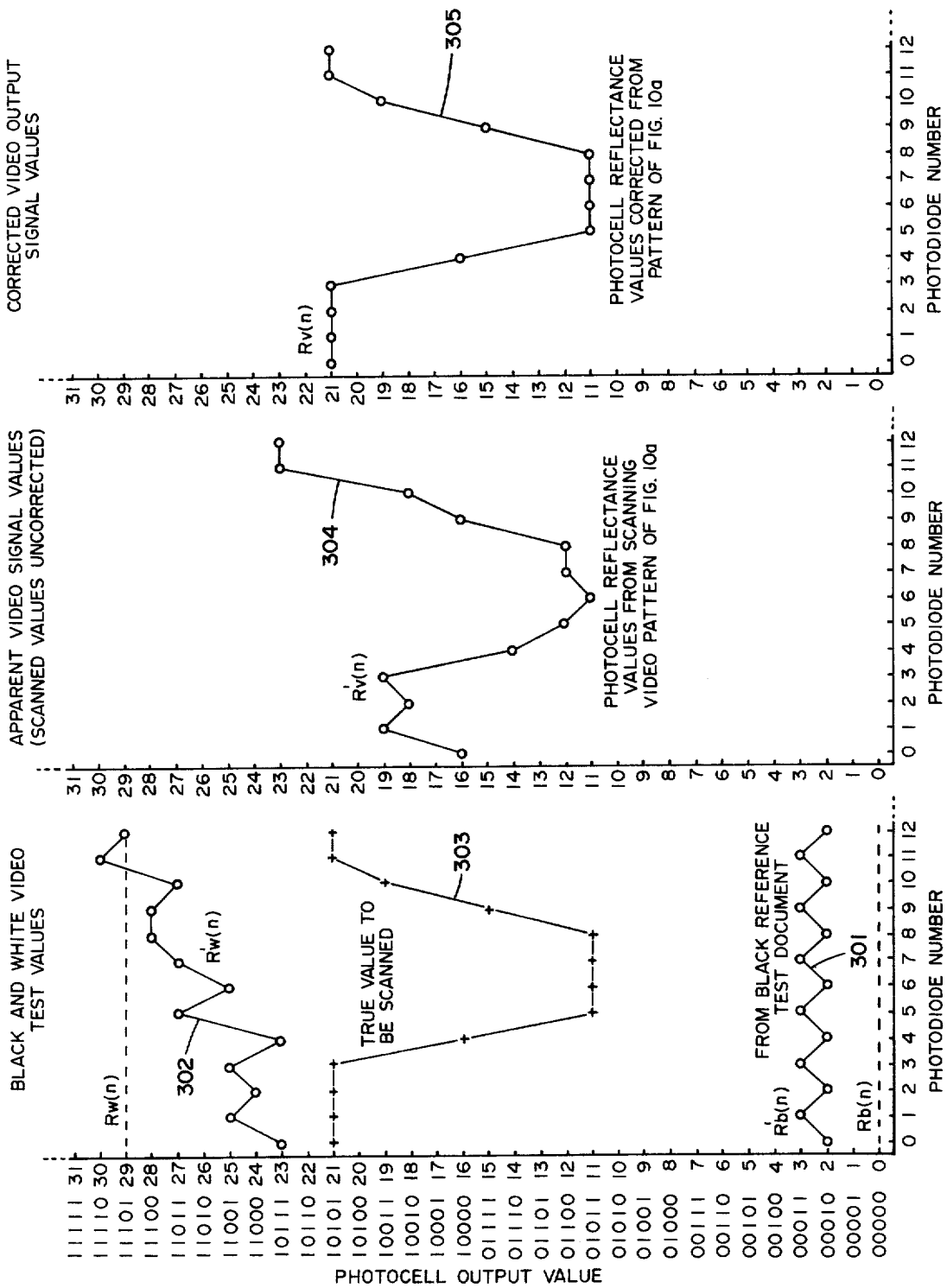

The function and operation of the fixed pattern error correction circuitry of FIG. 8 may be further clarified with reference to FIGS. 10a–10c. FIGS. 10a, 10b and 10c are a set of three graphs which illustrate signal values for both black and white test references (FIG. 10a); apparent video signal values directly from the photocell scanner (FIG. 10b); and the corrected video output signal from the error correction circuitry (FIG. 10c). Referring first to FIG. 10a, photocell output values may occur at any one of the 32 possible signal levels between black=00000 and white=11111. The signal pattern 301 is obtained as an output from the first 13 photocells of the array when a black test document is moved beneath the array. The data in the pattern 301 alternates in an odd-even pattern, and represents error due primarily to clock noise. The data obtained from the white reference test is shown in signal pattern 302. The white reference value selected, $R_w(n)$, is 11101, while the black reference, $R_b(n)$ is selected as 00000.

After calibration, the true video to be scanned from a document to be processed is shown in pattern 303 of FIG. 10a. FIG. 10b illustrates the data pattern 304 obtained from the outputs of the first 13 photocells prior to any error correction of the video signal. It will be noted that the actual video signal pattern 304 is of the same format, but somewhat different in regularity, from the true video to be scanned shown by signal pattern 303 of FIG. 10a. After the signal 304 has been processed by the error correction circuitry of FIG. 8, to eliminate both black-related and white-related errors, the data output of the error correction circuitry is that shown by signal pattern 305 of FIG. 10c. The corrected video signal 305 of FIG. 10c is virtually identical to the true video signal to be scanned, shown in FIG. 10a.

Prior art page width processors which employ self-scanned photodiode arrays without fixed pattern error correction have encountered many accuracy and reliability difficulties. Moreover, as the number of individual photocells employed in a page width scanning array is increased to enhance character resolution, the error factor is also multiplied. The error correction techniques used in the circuitry of FIG. 8 substantially increase the accuracy of a page width scanning system, and thereby make implementation of such a system practical.

SCAN PATTERN ERROR CORRECTION

Figure 11:
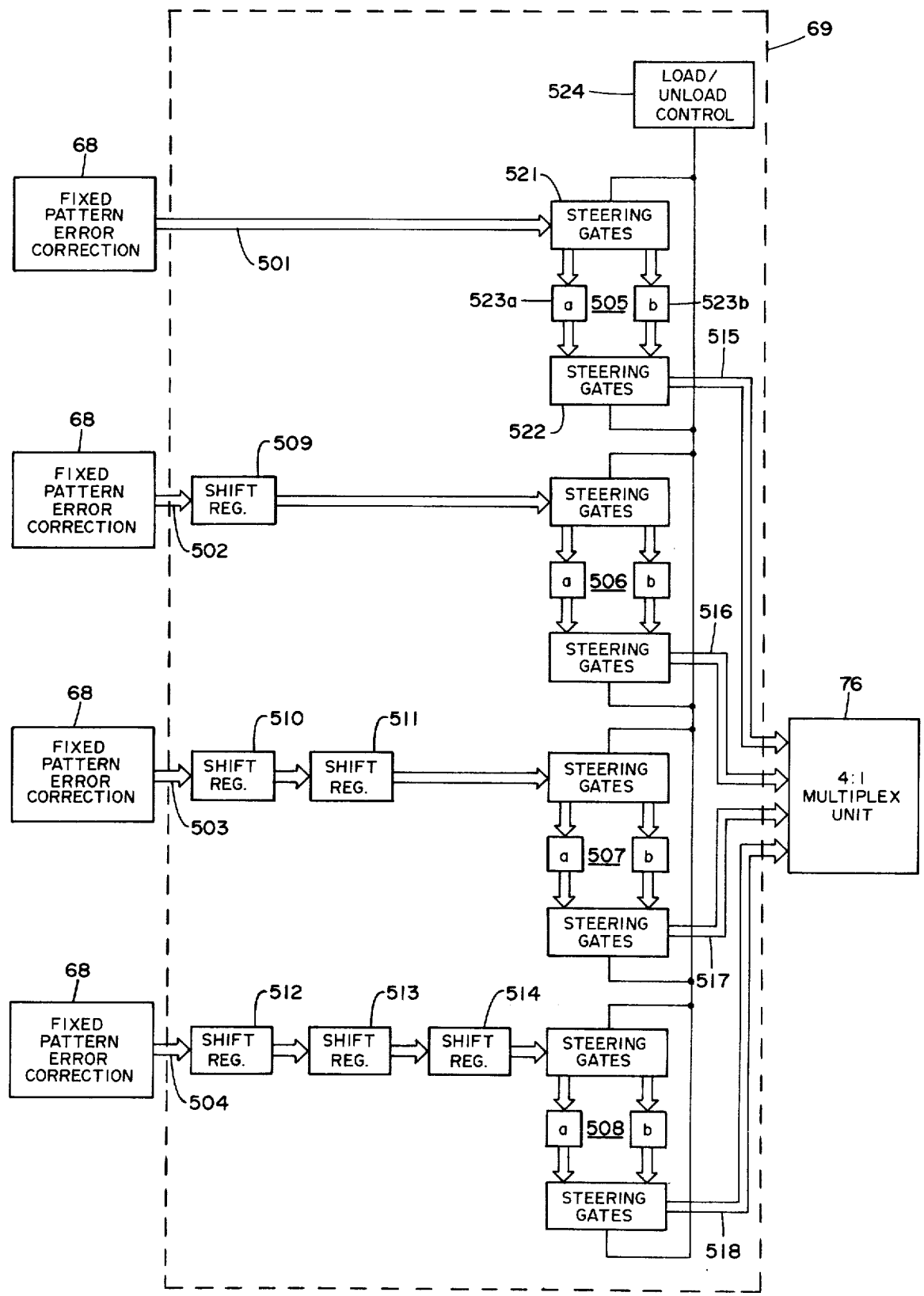
FIG. 11 is a block diagram of the scan pattern error correction circuitry used in the system of the invention.

After the video data has been corrected for fixed pattern errors by the circuitry of FIG. 8, it is input to the scan pattern error correction circuitry of FIG. 11. FIG. 11 is a block diagram illustrating the arrangement and function of the scan pattern error correction circuit employed in the invention to eliminate scan offset errors in the photocell output pattern. Data from each of the fixed pattern error correction circuits 68 is output to one of four channels 501-504, respectively. Data on channel 501 is passed directly into a first video buffer memory 505. Data on channel 502 is coupled to the input of a first scan delay shift register 509, the output of which is connected to a second video buffer memory 506. Channel 503 is connected to the input of two series connected scan delay shift registers 510 and 511, output of which is connected to a third scan video buffer memory 507. Channel 504 is connected to the input of three series connected scan delay shift registers 512, 513 and 514 the output of which is coupled to a fourth video buffer memory 508. The respective outputs of the four video buffer memories 505–508 are connected via channels 515–518 to the inputs of the 4:1 multiplex unit 76.

Each one of the video buffer memories 501–508 are identical. The first buffer memory 505 includes input steering gates 521, output steering gates 522 and a pair of buffer storage registers 523a and 523b. The steering gates 521 and 522 are operated by a load/unload control unit 524 to alternately load registers 523a and 523b. The buffer memories 505–508 enable data from the fixed pattern error correction circuits 68 to be loaded into one of the two registers, 523a or 523b, at the same time data is being unloaded from the other register and passed over channels 515–518 to the 4:1 multiplex unit 76.

Figure 12:
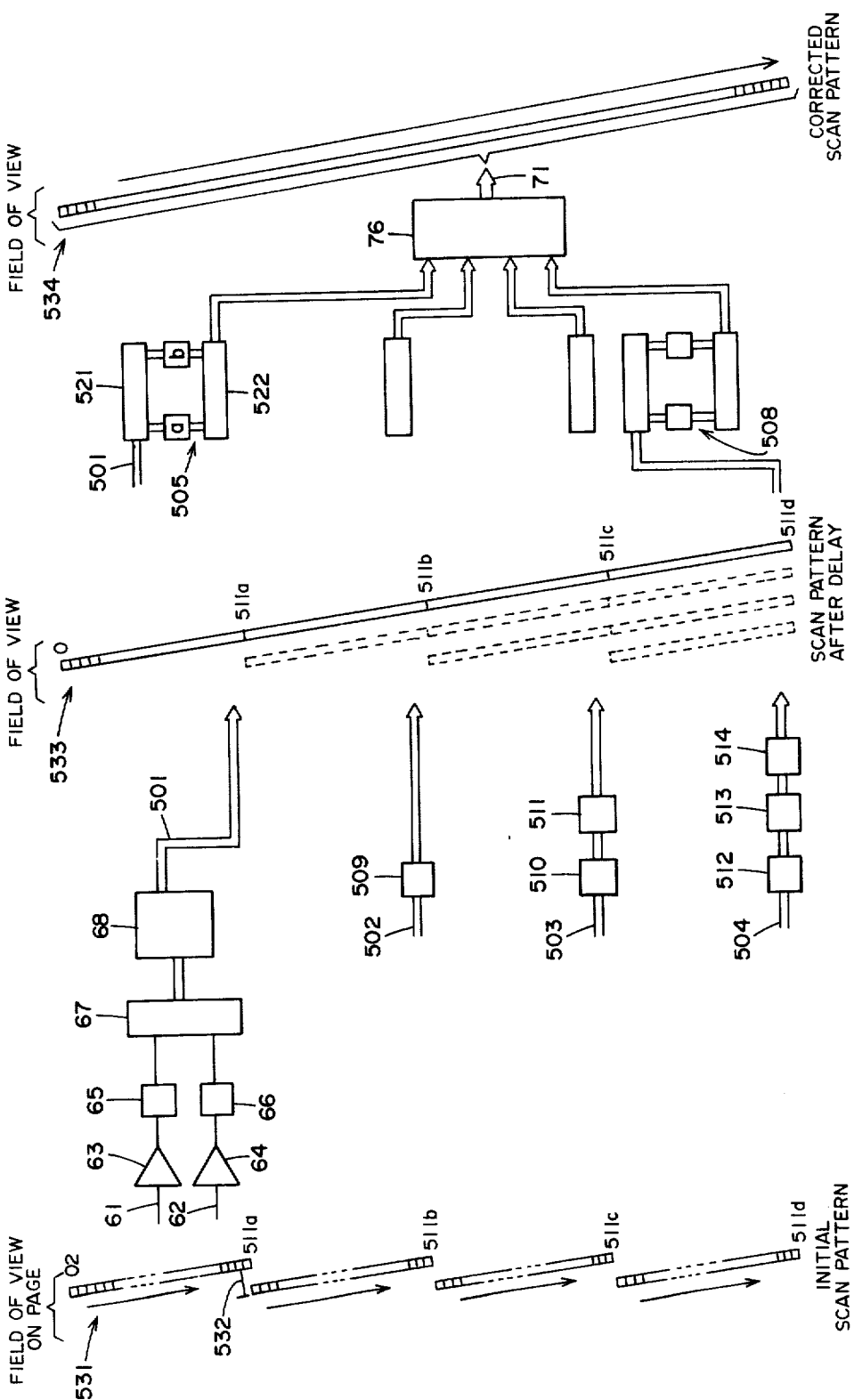
FIG. 12 is a fragmented partial block diagram which serves to explain the operation of the circuitry of FIG. 11.

Referring now to FIG. 12, there is shown a fragmented partial block diagram illustrating the manner in which the circuitry of FIG. 11 effects scan pattern correction. As explained earlier, each one of the four 512 element arrays are scanned simultaneously in the same direction. The time required to scan an array may be on the order of 200 to 400 microseconds with 256 microseconds being a scanning rate used in one embodiment. Since documents are in motion during scanning the particular document area in alignment with the last element in one array is offset slightly from the area in alignment with the first element in the next adjacent array. For example, with typical document speeds and scanning rates the offset may be on the order of four mils. In order to avoid recognition errors resulting from this scan pattern offset, the data from each scan are preferably corrected to eliminate the offset and produce a scanned data pattern wherein all of the data are aligned in a single columnar pattern prior to recognition processing.

Referring now to FIG. 12, the initial scan pattern from the four 512 element arrays is segmented, as shown in area 531. That is, the end portions of adjacent arrays are offset from one another. For example, there is an offset, designated by character 532, between the data from cell 511a and data from cell 0b. The preferred scan pattern configuration is one wherein the data from each of the cells in all four of the arrays are essentially axially aligned in a single columnar pattern.

Scan correction is accomplished by providing the series of delaying shift registers 509–514 to delay the data from each scan for a preselected period and thereby compensate for the scan offset. Each of the registers 509–514 comprises a dynamic shift register having a storage capacity of 512 words comprising four to five bits per word. Each register is driven at the clock rate so that the time required to shift a particular data word through one register is the equivalent of one column delay and compensates for the offset between adjacent columns. That is, the first group of data over channel 501, does not incorporate any delay at all. The second group of data, from channel 502, is delayed for one column by passage through shift register 509. The third group of data, on channel 503, is delayed for two columns by shifting through two series connected shift registers 510 and 511. Finally, the fourth group of data on channel 504, is delayed for three columns by shifting through series connected registers 512, 513 and 514. Passage through the groups of serial shift registers produces data outputs which have been delayed sufficiently to realign each of the scans so that the adjacent ends of contiguous scans are shifted the amount of its offset from the data of the undelayed scan.

Referring to the scan pattern after delays, designated by area 533, data is input to the four video buffer memories 505–508 at the clock rate $\phi$. The video buffer memories enable data to be loaded into a register at the clock rate and unloaded from a register at $4\phi$, four times the clock rate. The memories are controlled so that there is an alternating sequence of (1) load register $a$ at the clock rate $\phi$ and simultaneously unload the contents of register $b$ at $4\phi$; and (2) load register $b$ at the clock rate $\phi$ while simultaneously unloading register $a$ at $4\phi$. The output data from the steering gates of each of the video buffer memories 505–508 is input to the 4:1 multiplex unit 76. The output of the multiplex unit 76, over channel 71, comprises a corrected scan pattern as designated in area 534. The corrected scan pattern from each of the four 512 element arrays is now axially aligned into a signle 2,048 element column of data serially clocked at four times the clock rate, i.e., $4\phi$.

Prior art page width processors have attempted scan pattern correction by tilting adjacent arrays to introduce an initial offset. These systems have encountered many accuracy and reliability difficulties. Moreover, as the length of scan is increased to inhance line resolution, the error factor due to scan offset is also increased. The scan pattern correction technique used in the circuitry of FIG. 11 substantially increases the accuracy of a page width scanning system, eliminates a substantial source of error, and thereby makes implementation of such a system practical.

VIDEO MEMORY

Figure 13:
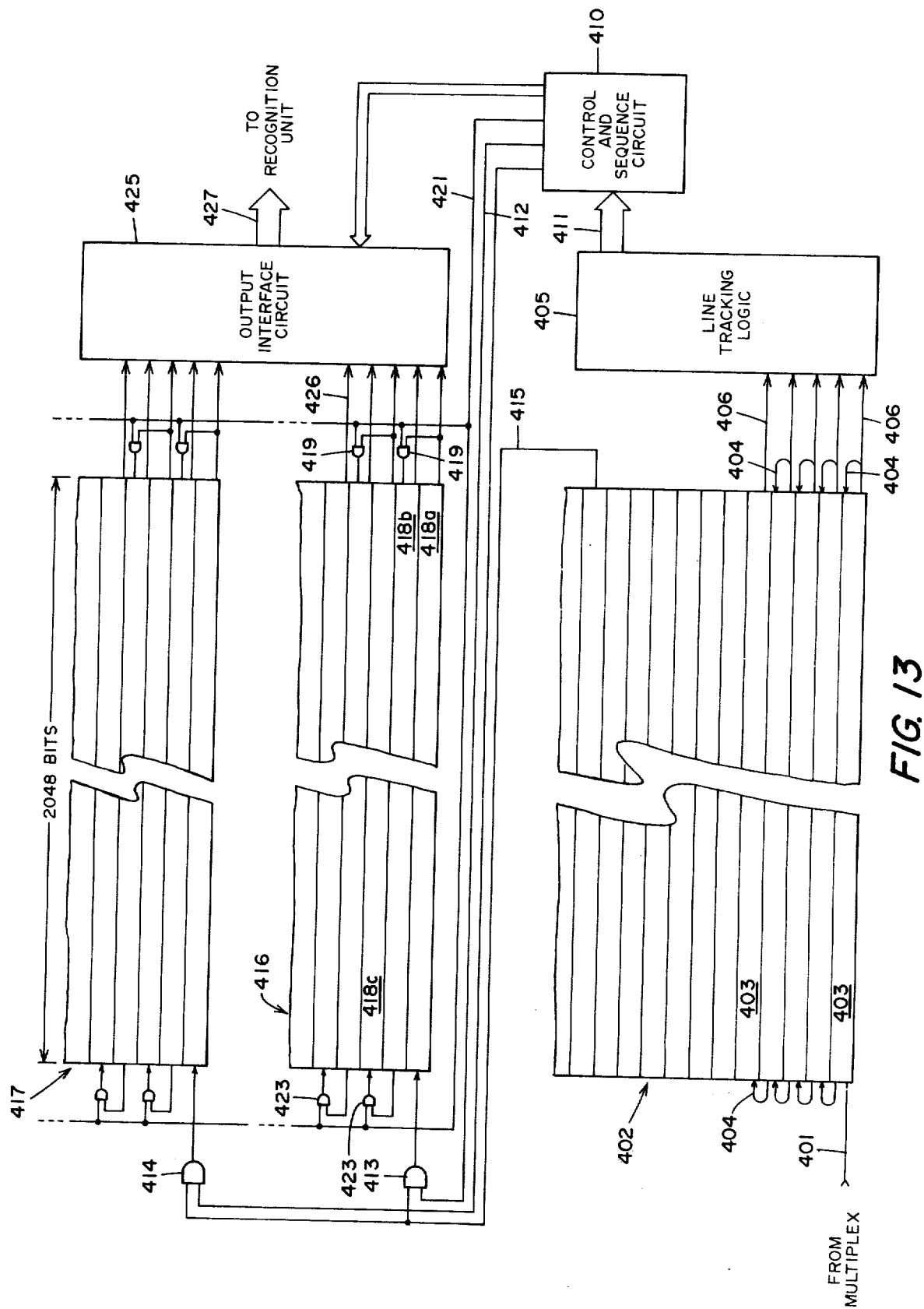
FIG. 13 is a block diagram of the memory circuit used in the system of the invention.

The scanned character data, after both fixed pattern and scan pattern error correction, is multiplexed, binary quantized, and sent to the video memory circuitry shown in FIG. 13. The multiplexed data on path 401 is input to a primary video buffer 402 comprising an array of cascaded dynamic shift registers 403. In the present embodiment, each register 403 preferably has storage capacity for at least 2,048 bits (to accommodate data from four photodiode arrays of 512 bits each). The individual shift registers 403 are interconnected with one another via recirculation paths 404 to shift the data through the memory in a zig-zag fashion at the scanning rate. The shift registers 403 are preferably comprised of silicon gate MOS integrated circuit devices. The output of the storage element for word $n$ provides input data for the word $n+1$ so that the memory contents are continuously shifted through the registers at a rate corresponding to the scanning frequency rate. The memory 402 has sufficient capacity for storage of a page width line of characters; the approximate area of a page being stored to allow for line skew being stored is 9 inches in width × ¾ inch in height. Video memory word length and the number of words to be stored is fixed by the scanning resolution. For a preferred 4 mil × 4 mil document sampling, the memory is 2,048 bits per word and 192 words in height.

The passage of data through the memory 402 is monitored by a line-tracking logic unit 405 via leads 406. The line-tracking logic unit 405 functions to monitor the data stored in memory 402 and includes the following elements:

a. a black-white character line edge detection logic unit;

b. storage elements for the accumulation of character line top and bottom edge coordinates;

c. computation logic for generating instructions for extracting data containing a line of characters; and d. circuitry for the measurement of character height data as well as character line length.

When the line-tracking logic unit 405 observes a complete line of characters, control signals are passed to a control-and-sequence circuit 410 over path 411, and an enable signal is applied over leads 412 to energize one of the two AND gates 413 and 414. The character data is then transmitted over line 415, through one of the two gates 413 or 414 and into one of two secondary buffer memories 416 and 417. The memories 416 and 417 are also comprised of a plurality of cascaded dynamic shift registers 418 and preferably include storage areas for 2,048 bits per register for 48 scans in height. Two memories are provided to permit processing of data at the scanning frequency. While one of the secondary buffer memories is being loaded with a line of characters from the primary video buffer memory 402, the other secondary buffer is being unloaded to recognition circuitry.

Referring to secondary buffer 416 by way of example, data is input to register 418a. When it reaches the end of register 418a, it passes through one of the gates 419 which has a recirculate signal applied thereto over path 421 from the control-and-sequence circuit 410. The train of data is then shifted out the end of the register 418a and back down the next adjacent register 418b. Once it reaches the end of register 418b the data passes through one of the gates 423, which also has a recirculate signal applied thereto, into the next adjacent register 418c and so forth until an entire line of characters has been loaded into the memory 416.

When the memory 416 is fully loaded, the output interface circuitry 425 and the control-and-sequence circuit 410 remove the recirculate signal and apply a disable signal over path 421 to disable the gates 419 and 423. All of the stored data is then unloaded in parallel over paths 426 through the output interface circuitry and via channel 427 to the recognition unit. While the memory 416 is being dumped to the recognition unit, the next line of characters is being input to memory 417 through gate 414 in a manner identical to the loading of memory 416.

The alternate loading and unloading of the secondary buffer memory units 416 and 417 from the primary buffer memory 402 enables the system to operate and continuously process data at the scanning frequency.

While cascaded dynamic shift registers are preferred for the buffer memories 402, 416 and 417, it is to be understood that other types of data storage systems might be used. For example, these memories could comprise random access memories implemented with bipolar integrated memory chips. Data is entered bit-by-bit in single words, corresponding to a scan across a page, at random memory locations. This format of buffer memory is of particular interest with respect to formatted documents wherein the paper advance is controlled in order to place the data field to be read within the memory "field of view" thereby avoiding the complexity of a character line which is split; for example, where the memory field of view border falls along a character line. If a random access memory unit is employed for the memory 402, line tracking logic 405 must also include an address generation unit which provides sequential row-and-column research instructions to examine a group of bit locations from several parallel words.

A further technique which may be employed for the buffer memories is that of charge-coupled register elements arranged in the same configuration as the cascaded dynamic MOS shift registers described above. Charge-coupled shift registers possess the advantages over MOS devices of greatly reduced costs and increased shift rates. Further, charge-coupled shift registers enable the inclusion of logic functions within the shift register elements to simplify line-tracking functions. Another advantage is inherent in the fact that charge-coupled shift registers can also store analog data whereas other techniques are restricted to digital data only.

Having described the invention in connection with certain specific embodiments thereof, it is to be understood that further modificatios may now suggest themselves to those skilled in the art and it is intended to cover such modifications as fall within the scope of the appended claims.

What is claimed is:

1. A page width optical scanning system of the type wherein an image of a portion of a complete line of characters on a document is projected onto a plurality of groups of photosensitive means arranged in a single column, the groups to be scanned simultaneously, the photosensitive means extending parallel to character line length and wherein the output signals of all the photosensitive means in the array are periodically scanned and sampled, and wherein said system includes means for correcting scan pattern offset which comprises:

multiplexing means having a plurality of inputs and a single output;

means for delaying for selected periods, scanned data from each of said groups of photosensitive means, respectively, said periods being equal to the time required to compensate for scan pattern offset from each of the groups of photosensitive means; and means for transferring delayed data from each of said groups of photosensitive means, respectively, to individual inputs of said multiplexing means and produce scan corrected data at the output thereof.

2. A page width optical scanning system of the type wherein an image of a portion of a complete line of characters on a document is projected onto a plurality of groups of photosensitive means arranged in a single column, the groups to be scanned simultaneously, the photosensitive means extending parallel to character line length and wherein the output signals of all the photosensitive means in the array are periodically scanned and sampled, and wherein said system includes means for correcting scan pattern offset which comprises:

multiplexing means having a plurality of inputs and a single output;

first means for transferring second data from one of said groups of photosensitive means to one input of said multiplexing means;

means for delaying for selected periods, scanned data from each of said remaining groups of photosensitive means, respectively, said periods being equal to the time required to compensate for scan pattern offset from each of the groups of photosensitive means; and second means for transferring delayed data from each of said remaining groups of photosensitive means, respectively, to individual inputs of said multiplexing means and produce scan corrected data at the output thereof.

3. A page width optical scanning system as set forth in claim 2 wherein said second means for transferring includes buffer storage means located between said means for delaying and said multiplexing means, said buffer storage means comprising:

a pair of storage registers;

input steering gates for directing data signals from said means for delaying into one of said pairs of storage registers, alternately;

output steering gates for directing data signals from said pair of storage registers into said multiplexing means; and control means for energizing said input and output steering gates alternately to simultaneously direct data into one register and out of the other register and thereby increase the rate at which character cell data is processed.

4. A page width optical scanning system as set forth in claim 3 wherein said first means for transferring includes:

a pair of storage registers;

input steering gates for directing data signals from the one of said groups of photosensitive means into one of said pairs of storage registers, alternately;

output steering gates for directing data signals from said pair of storage registers into said multiplexing means; and control means for energizing said input and output steering gates alternately to simultaneously direct data into one register and out of the other register and thereby increase a rate at which character cell data is processed.

5. A page width optical scanning system including a document transport, comprising in combination:

a first group of a plurality of photosensitive means for repreatedly scanning a segment of a line of characters and producing output data signals indicative of light or dark character areas;

at least one additional group of a plurality of photosensitive means aligned with the first group of photosensitive means in a direction transverse of the document transport, said at least one additional group of photosensitive means repeatedly scanning respective segments of the line of characters simultaneously with the first group of photosensitive means, each additional group producing output data signals indicative of light or dark character areas;

a plurality of non-illumination-related error correcting means equal in number to the groups of photosensitive means for individually receiving the output data signals from one of said groups of photosensitive means for correcting non-illumination-related errors in the output data signals to provide non-illuminated corrected signals;

a plurality of illumination-related error correcting means equal in number to the groups of photosensitive means for individually receiving non-illuminated corrected signals from the non-illumination-related error correcting means for correcting illumination-related errors and provide corrected data signals;

means for multiplexing the corrected data signals from each group of photosensitive means into a single data channel;

means for quantizing said single data channel to indicate a black condition signal or a white condition signal for each output data signal from said photosensitive means; and buffer memory means for receiving said black condition and white condition signals from successive line scans and storing data for at least one entire line of characters for subsequent processing by character recognition circuitry.

6. A page width optical scanning system as set forth in claim 5 wherein each group of photosensitive means includes:

a plurality of photodiodes arranged in a linear array extending parallel to the line of characters;

means for separating said photodiodes into a plurality of groups;

means for sampling the output data signals from the photodiodes in each group simultaneously by group and sequentially within each group to increase the scanning rate by a factor equal to the number of groups; and means for multiplexing the sampled output data signals from each group of photodiodes into a single data channel.

7. A page width optical scanning system as set forth in claim 6 wherein each photodiode includes a ground terminal and a signal terminal and wherein said sampling means includes:

a common bus connected to the ground terminal of each of the photodiodes in said array;

a video bus;

normally de-energized switching means connected between the signal terminal of each of the photodiodes in said array and said video bus; and means for momentarily energizing each of said switching means in sequence to connect the signal terminal of each photodiode to said video bus and produce a train of video data signals between said video and common busses.

8. A page width optical scanning system as set forth in claim 7 wherein:

said normally de-energized switching means includes a field-effect transistor having the source and the drain electrodes connected between said video bus and the signal terminal of each of the photodiodes;

said energizing means includes a multi-stage shift register having the output of each stage connected; respectively, to the control electrode of each of said transistors; and means for shifting an enable bit through said shift register at the scanning frequency to sequentially energize said transistors and produce said train of video data.

9. A page width optical scanning system as set forth in claim 5 including:

an elongate concave reflector extending parallel to said line of characters; and an elongate source of illumination located within and extending parallel to the axis of said reflector to project a narrow column of light onto said line of characters when said illumination source is energized.

10. A page width optical scanning system as set forth in claim 5 wherein each group of photosensitive means includes a plurality of photodiodes arranged in a single column, the groups to be scanned simultaneously, and wherein said system includes means for correcting scan pattern offset which comprises:

first means for transferring scanned data from said first group of photodiodes to one input of said multiplexing means;

means for delaying, for selected periods, scanned data from each of said at least one additional group of photodiodes, respectively, said periods being equal to the time required to compensate for scan effect errors of output data signals from each of the groups of photodiodes; and second means for transferring data from each of said groups of photodiodes, respectively, to individual inputs of said multiplexing means and produce scan corrected data at the output thereof.

11. A page width optical scanning system as set forth in claim 10 wherein said delaying means includes a plurality of dynamic shift registers.

12. A page width optical scanning system as set forth in claim 5 wherein said buffer memory means includes:

a primary buffer memory for storing black condition and white condition signal data for at least one entire line of characters;

a pair of secondary buffer memories; and means for transferring signal data from said primary memory to said secondary memories alternately whereby one secondary memory is loaded while the other secondary memory is unloaded to a recognition unit.

13. A page width optical scanning system as set forth in claim 12 wherein said primary and secondary buffer memories each include:

a plurality of multi-stage shift registers connected in series; and means for shifting black condition and white condition signal data through said series-connected registers at the rate of scanning the line of characters.

14. A page width optical scanning system as set forth in claim 13 wherein said means for transferring signal data includes:

line tracking means connected to each of said shift registers comprising said primary buffer memory; and control means responsive to said line tracking means for initiating data transfer upon a complete line of character data being accumulated in said primary buffer memory.

15. A page width optical scanning system as set forth in claim 5 wherein each of the plurality of non-illuminated-related error correcting means includes a storage means having a plurality of error correcting signals equal in number to the photosensitive means for individually correcting a data signal from one of the photosensitive means for non-illuminated-related errors to provide a non-illuminated corrected signal for the respective photosensitive means.

16. A page width optical scanning system as set forth in claim 5 wherein each of said plurality of illuminated-related error correcting means includes storage means having a plurality of error correcting signals equal in number to the photosensitive means for individually correcting the non-illuminated corrected signal of a respective photosensitive means for illuminated-related errors to provide a corrected data signal.

17. A page width optical scanning system of the type wherein an image of a portion of a complete line of characters on a document is projected onto a linear photocell array extending parallel to character line length and wherein the output signals of the photocells in said linear array are periodically scanned and sampled, converted to a digital format, and input to a recognition unit for character identification, wherein the improvement comprises:

means for subtracting the output signal from each photocell when said photocell has a black document image projected thereon to a black reference signal to provide a difference signal;

means for storing the difference signal from said means for subtracting for each photocell as a black code;

means for subtracting the stored black code for each photocell from the output signal from each photocell, respectively, to produce a black corrected photocell output signal;

means for dividing the black corrected output signal from each photocell when said photocell has a white document image projected thereon to a white reference signal to provide a quotient signal;

means for storing the quotient signal for each photocell as a white code; and means for multiplying the stored white code for each photocell times the black corrected output signal from each photocell, respectively, to produce photocell output signals corrected for both non-illumination-related and illumination-related fixed pattern errors.

18. A page width optical scanning system as set forth in claim 17 wherein said means for storing the difference signal includes a multi-stage recirculating dynamic shift register having one stage associated with each photocell in said array.

19. A page width optical scanning system as set forth in claim 17 wherein said means for storing the quotient signals includes a multi-stage recirculating dynamic shift register having one stage associated with each photocell in said array.

* * * * *

UNITED STATES PATENT OFFICE
CERTIFICATE OF CORRECTION

Patent No. 3,962,681　　　　　Dated　June 8, 1976

Inventor(s)　Stanley C. Requa et al

It is certified that error appears in the above-identified patent and that said Letters Patent are hereby corrected as shown below:

Col. 1, line 11, "date" should be --data--.
Col. 7, line 31, "th" should be --the--;
　　　line 67, "apparatus" should be --apparent--.
Col. 8, line 36, "theanalog-to-digital" should be --the analog-to-digital--.
Col. 9, line 15, "documen" should be --document--.

Col. 14, line 18, "second" should be --scanned--;
　　　line 68, "repreatedly" should be --repeatedly--.

Signed and Sealed this

Twenty-eighth Day of September 1976

[SEAL]

*Attest:*

RUTH C. MASON
*Attesting Officer*

C. MARSHALL DANN
*Commissioner of Patents and Trademarks*